US009111036B2

(12) United States Patent
Eigler et al.

(10) Patent No.: US 9,111,036 B2
(45) Date of Patent: Aug. 18, 2015

(54) PRELOADING UNWIND DATA FOR NON-INTRUSIVE BACKTRACING

(75) Inventors: Frank Ch. Eigler, Brantford (CA); Mark J. Wielaard, Deventer (NL)

(73) Assignee: Red Hat, Inc., Raleigh, NC (US)

( * ) Notice: Subject to any disclaimer, the term of this patent is extended or adjusted under 35 U.S.C. 154(b) by 1030 days.

(21) Appl. No.: 12/771,175

(22) Filed: Apr. 30, 2010

(65) Prior Publication Data

US 2011/0271148 A1 Nov. 3, 2011

(51) Int. Cl.
*G06F 9/44* (2006.01)
*G06F 11/36* (2006.01)
*G06F 11/34* (2006.01)

(52) U.S. Cl.
CPC .......... *G06F 11/3664* (2013.01); *G06F 11/366* (2013.01); *G06F 11/3471* (2013.01); *G06F 2201/865* (2013.01)

(58) Field of Classification Search
USPC ................. 717/158, 163, 124–128, 130–131; 726/22; 702/183
See application file for complete search history.

(56) References Cited

U.S. PATENT DOCUMENTS

| | | | | |
|---|---|---|---|---|
| 5,361,351 A * | 11/1994 | Lenkov et al. | ................. | 717/124 |
| 5,634,058 A * | 5/1997 | Allen et al. | .................... | 717/163 |
| 6,678,883 B1 * | 1/2004 | Berry et al. | .................... | 717/128 |
| 6,754,890 B1 * | 6/2004 | Berry et al. | .................... | 717/128 |
| 6,959,262 B2 * | 10/2005 | Curry, III | ...................... | 702/183 |
| 7,707,555 B2 * | 4/2010 | Spertus et al. | ................. | 717/127 |
| 7,845,006 B2 * | 11/2010 | Akulavenkatavara et al. | . | 726/22 |
| 8,024,710 B2 * | 9/2011 | Kornstaedt | ..................... | 717/126 |
| 8,458,671 B1 * | 6/2013 | Hostetter et al. | .............. | 717/131 |
| 8,566,796 B2 * | 10/2013 | Cates | ............................ | 717/128 |
| 2003/0101380 A1 * | 5/2003 | Chaiken et al. | ................. | 714/38 |
| 2003/0182655 A1 * | 9/2003 | Hundt et al. | .................... | 717/158 |
| 2003/0204838 A1 * | 10/2003 | Caspole et al. | ............... | 717/130 |
| 2004/0083460 A1 * | 4/2004 | Pierce | .......................... | 717/131 |
| 2004/0163077 A1 * | 8/2004 | Dimpsey et al. | .............. | 717/130 |
| 2005/0155026 A1 * | 7/2005 | DeWitt et al. | ................. | 717/158 |
| 2005/0172271 A1 * | 8/2005 | Spertus et al. | ................. | 717/125 |
| 2008/0141222 A1 * | 6/2008 | Alpern | .......................... | 717/125 |
| 2008/0295078 A1 * | 11/2008 | Stall et al. | ..................... | 717/125 |
| 2010/0042977 A1 * | 2/2010 | Chinchalkar et al. | ......... | 717/128 |

OTHER PUBLICATIONS

Haggstrom, Christian. "Detection of Memory Allocation Bugs on System Level". Mar. 31, 2005.*

* cited by examiner

*Primary Examiner* — Lewis A Bullock, Jr.
*Assistant Examiner* — Gilles Kepnang
(74) *Attorney, Agent, or Firm* — Lowenstein Sandler LLP (57) ABSTRACT

An unwind data system stores unwind data for a target module in memory pages in main memory prior to an introspection tool making an attempt to generate a backtrace for the target module. The unwind data system detects a trigger in a user script, which includes instructions to generate a backtrace for the target module using the introspection tool. The trigger corresponds to a section of software code of the target module. The unwind data system locates the unwind data in the memory pages in the main memory for the section of software code of the target module and unwinds the section of software code to generate a backtrace using the unwind data located in the memory pages in the main memory.

18 Claims, 5 Drawing Sheets

PRELOADING UNWIND DATA FOR NON-INTRUSIVE BACKTRACING

TECHNICAL FIELD

Embodiments of the present invention relate to analyzing performance of software. Specifically, the embodiments of the present invention relate to preloading unwind data for non-intrusive backtracing.

BACKGROUND

A software program may unexpectedly be interrupted or stopped. A user, such as a system administrator, a software developer, and a performance analysis staff member, can use an introspection tool, such as the SystemTap introspection tool for the Linux® operating system, to generate a backtrace for the software to help determine the activities of the software leading up to the moment of the interruption. A backtrace is a textual report that lists all of the functions in the software that were running at the moment of the interruption, including the function parameters, the current state of nested function calls in the software program, etc. The introspection tool can translate the backtrace into a function call stack, which is a translation of the backtrace data into a human readable format.

To generate a backtrace, the introspection tool performs a complicated search on the memory state of the stopped program software. Some data that the introspection tool uses to perform that search, such as 'unwind data', is often not loaded into the program software itself. Examples of unwind data include unwind tables and symbol tables. Typically, the introspection tool searches for the unwind data on a disk file, a network, or virtual memory, which traditionally can take on the order of seconds. As a result, there is a large amount of processing overhead during a backtrace generating operation that makes an introspection tool an intrusive system, rather than non-intrusive system.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for preloading unwind data and using the preloaded unwind data for non-intrusive backtracing. An unwind data system stores unwind data for a target module in memory pages in main memory prior to an introspection tool making an attempt to generate a backtrace for the target module. The unwind data system detects a trigger in a user script, which includes instructions to generate a backtrace for the target module using the introspection tool. The trigger corresponds to a section of software code of the target module. The unwind data system locates the unwind data in the memory pages in the main memory for the section of software code of the target module and unwinds the section of software code to generate a backtrace using the unwind data located in the memory pages in the main memory.

Embodiments of the present invention enable an introspection tool to preload unwind data in memory pages in the main memory of a system (also known as resident memory, physical memory, system memory, internal memory, and primary storage) before the introspection tool attempts to generate a backtrace. In one embodiment, the memory pages in the main memory are memory pages in a designated kernel memory space. In another embodiment, the memory pages in the main memory are memory pages that are locked in the main memory. Having the unwind data preloaded in the memory pages in the main memory allows an introspection tool to generate a backtrace much faster by accessing the unwind data from the main memory rather than accessing unwind data that is typically loaded, for example, on disk, on network storage, and in virtual memory.

Figure 1:
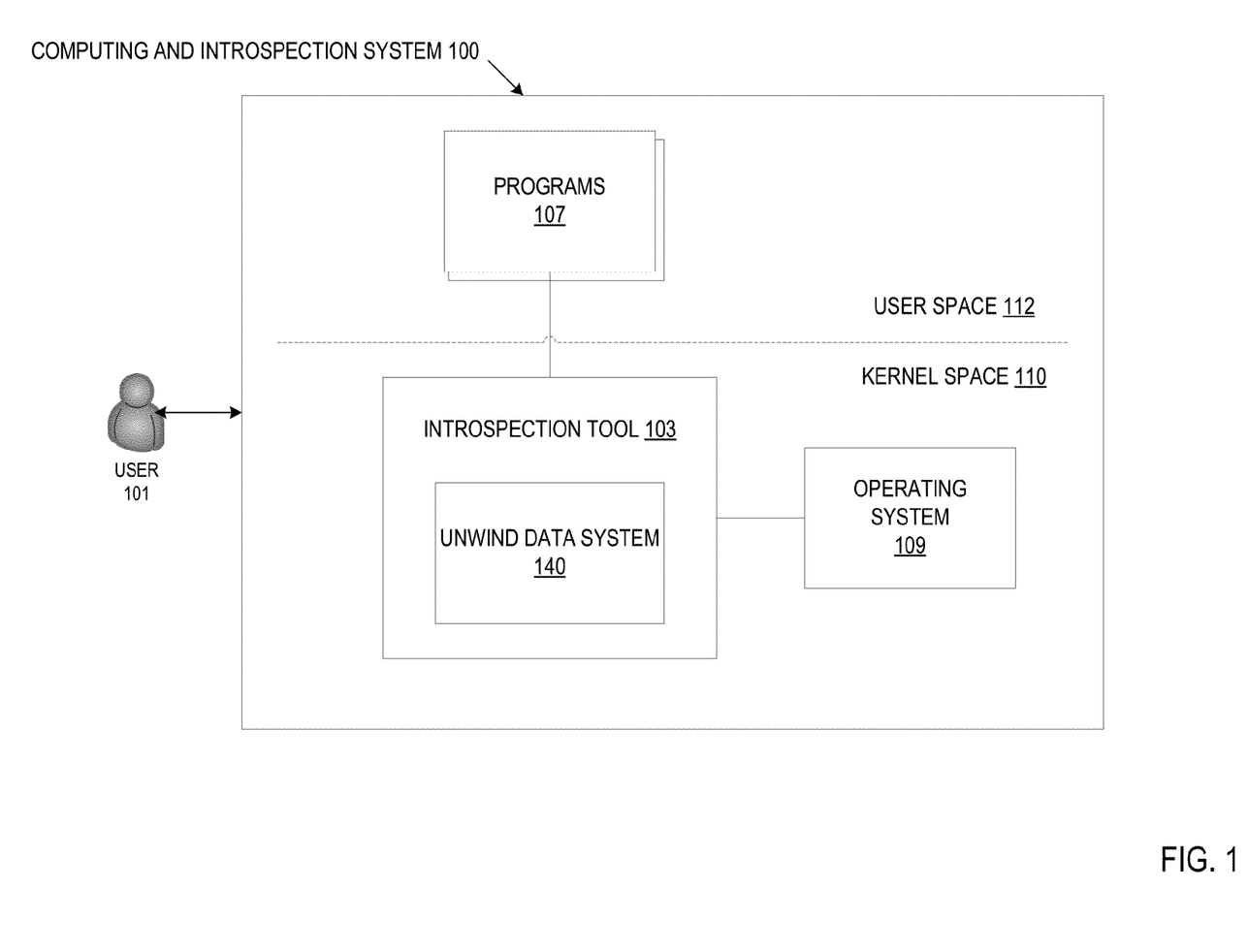
FIG. 1 illustrates an exemplary computing and introspection in which embodiments of the present invention may operate.

FIG. 1 illustrates an exemplary computing and introspection system 100 for preloading unwind data and accessing the preloaded unwind data for non-intrusive backtracing in accordance with some embodiments of the invention. System 100 includes memory that is the directly accessible to a CPU. Memory that is directly accessible to the CPU can be known as main memory, resident memory, physical memory, system memory, internal memory, and primary storage. The main memory is memory for which an operating system 109 guarantees that the contents of memory pages that reside in the main memory are not paged out to a 'swap' area, but are instantly accessible.

The main memory can be divided into regions, such as user space 112 and kernel space 110. The kernel space 110 is reserved for running an operating system 109 (e.g., Linux® OS, Windows® OS, etc.). The user space 112 is reserved for user mode programs including program(s) 107. Program 107 can represent one or more programs of any type including, for example, a browser program, a web program, a desktop program, etc. The computing and introspection system 100 hosts an introspection tool 103 in the kernel space 110 to allow a user 101 to examine and monitor the activities of a program 107 that is executing to help diagnose a performance or functional problem. The introspection tool 103 can also examine and monitor the activities of the operating system 109. A computing and introspection system 100 may be a personal computer, a laptop, a PDA, a mobile phone, etc.

A program 107 that is running in the computing and introspection system 100 may unexpectedly be interrupted or stopped. A user 101, such as a system administrator, a software developer, and a performance analysis staff member, can use an introspection tool 103 to 'unwind' the software of the program 107 to determine the program software activities that lead up to the moment of the interruption. A user can unwind the program software to reconstruct a call stack for the program 107. A call stack (or 'function call stack') is a stack data structure that stores information about the active subroutines of the program software. A function call stack is composed of call frames, where each call frame corresponds to a call to a subroutine in the program software.

'Unwinding' is the process of examining sections of the program software code, such as examining a transition of one call frame in the program software to a previous call frame in the program software. A backtrace is a textual report that lists all of the functions in the program software that were running at the moment of the interruption, including the function parameters, the current state of nested function calls in the program software, etc. The backtrace lists the program counter (PC) address for each call frame that was executed in the program software code to arrive at the starting call frame. The introspection tool 103 can translate the backtrace into a function call stack, which is a translation of the backtrace data into a human readable format. An example of an introspection tool 103 for the Linux® operating system is the SystemTap introspection tool.

The introspection tool 103 performs a search on the memory state of the stopped program 107 to generate a backtrace. Some of the data that the introspection tool 103 uses to perform that search, hereinafter referred to as 'unwind data', is often not loaded into the program 107 itself. Typically, the introspection tool 103 searches for the unwind data on a disk file, a network, or virtual memory, which traditionally can take on the order of seconds. However, an introspection tool 103, such as the SystemTap introspection tool, may not afford all of the delays that are involved in loading the unwind data to generate a backtrace because an introspection tool 103 is traditionally designed to be a non-intrusive system that allows users 101 to perform backtrace operations and performance measurements without the introspection tool 103 dramatically causing a new load of its own.

The introspection tool 103 can include an unwind data system 140 to help avoid a long and disruptive unwind data loading process. The unwind data system 140 can help make the process of generating a backtrace non-intrusive by preloading the unwind data from a datastore, for example, a disk file, a network, or virtual memory, to the memory pages in the main memory, for example, memory pages in the kernel space 110, in the computing and introspection system 100 to make it readily available, which, in turn, speeds up a backtrace and function call stack generating operation to the order of milliseconds or even less.

Figure 2:
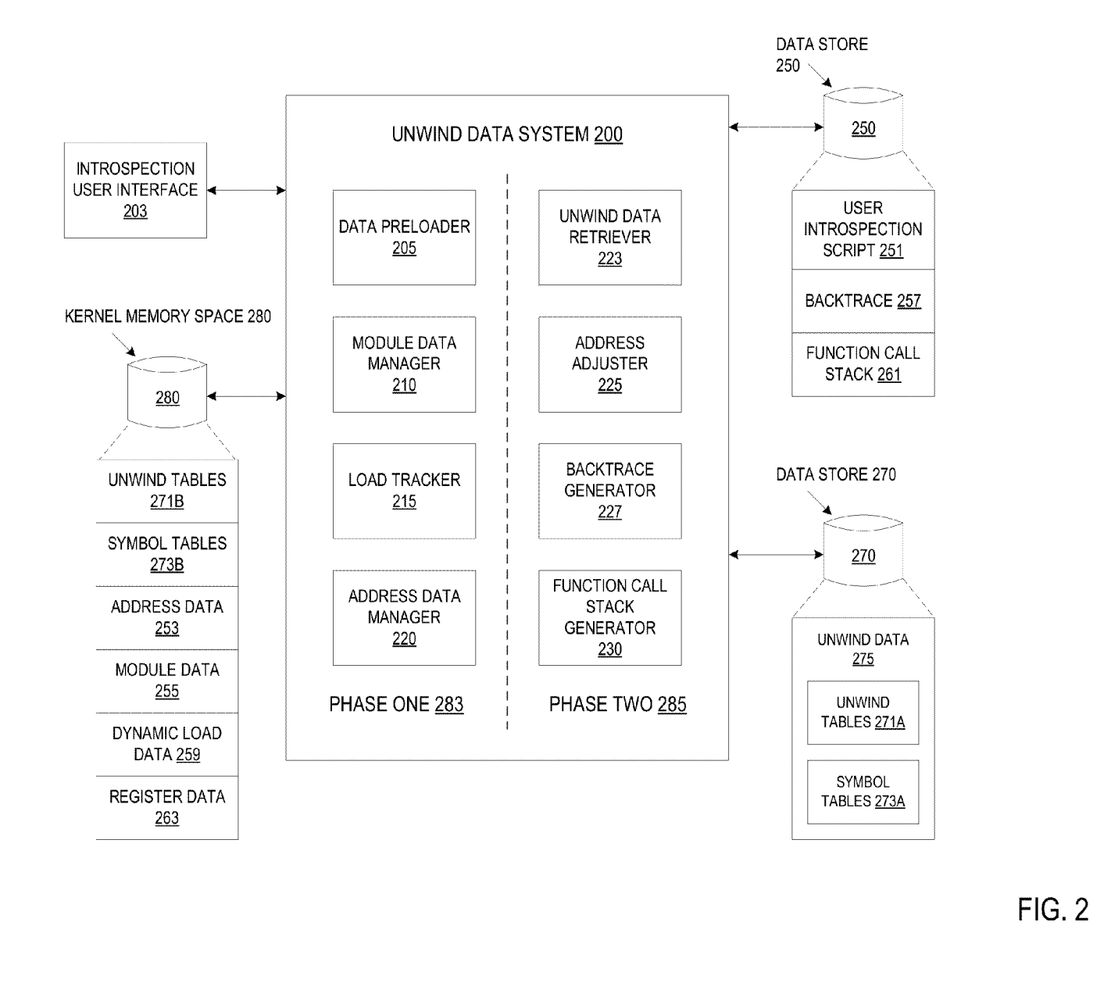
FIG. 2 is a block diagram of one embodiment an unwind data system.

FIG. 2 is a block diagram of one embodiment of an unwind data system 200. The unwind data system 200 may be the same as the unwind data system 140 in the computing and introspection system 100 of FIG. 1. When program software is interrupted or stopped, a user can use an introspection tool to generate a backtrace for the program software to determine the activities that lead up to the moment of interruption and can translate the backtrace into a function call stack.

The introspection tool uses unwind data to perform a search on the memory state of the stopped program software to generate a backtrace. The unwind data 275 may be generated by a compiler program, which compiled the program software that is being examined, and typically, is stored in debug data files in one or more data stores 270, such as disks, network storage, and virtual memory. Unwind data 275 can include unwind tables 271A and symbol tables 273A. Unwind tables 271A and symbol tables 273A include descriptions of sections of code of the program that is being examined. The unwind tables 271B are tables that can be used to generate a backtrace. An unwind table 271B includes code descriptions that describe algorithms for retrieving call frame information given a starting memory address and a register set. Code descriptions are encoded in a self-contained section, for example, called the '.eh_frame' section, in a program module that is in an executable and linkable file (ELF) format. Another example of an unwind table 271A is a DWARF call information table in a '.debug_frame' section in a program module that is in the DWARF format. DWARF is a standardized debugging data format.

The symbol tables 273B are tables that can be used to translate the backtrace into a function call stack to display the backtrace information in human readable form. A symbol table 273B includes code descriptions that can be used to find base information to display a backtrace for the program in human readable form. A symbol table 273B can include an entry for each symbol. An entry can include the symbol name, a value for the symbol, and other information for the symbol, such as the symbol's type (e.g., data object, function, etc.). The value for the symbol can be a memory address for the symbol, which is a relative address. A relative address is an address of a location in memory that is relative to a base address. A symbol table 273B has a base address of zero. An example of a symbol table 273B is the '.symtab' section in an ELF program module. Unwind tables 271A,B and symbol tables 273A,B are described in greater detail below in conjunction with FIG. 4.

An introspection tool can include an unwind data system 200 to preload the unwind tables 271B and symbol tables 273B from debug data that is stored in data stores 270 to memory that is the directly accessible to a CPU, such as memory pages in the main memory that is coupled to the unwind data system 200, prior to the unwind data system 200 making an attempt to generate a backtrace. In one embodiment, the memory pages in the main memory are memory pages in a designated kernel memory space 280. In another embodiment, the memory pages in the main memory are memory pages that are locked in the main memory. For example, an operating system may support "mlocking" of memory pages in the main memory.

In one embodiment, system 200 has components operating in two phases. For example, during phase one 283, the system 200 can locate unwind data 275, which is generated by a compiler, in debug data that is stored in one or more data stores 270, such as disks, network storage, and virtual memory. During phase one 283, the system 200 can preload the located unwind data 275 from the data stores 270 to main memory, such as designated kernel memory space 280. Phase one 283 can occur when an introspection tool starts to process a user script 251 and prior to the system 200 making an attempt to generate a backtrace (hereinafter referred to as 'start-up time'). Phase one 283 can include components, such as a data preloader 205, a module data manager 210, a load tracker 215, and an address data manager 220. During phase two 285, the system 200 can continue to process the user script 251 and can attempt to generate a backtrace and a function call stack using the unwind data that is preloaded in the kernel memory space 280. Phase two 285 can start occurring after the system 200 has preloaded the unwind data 275 from the data stores 270 to the kernel memory space 280. Phase two 285 can include components, such as an unwind data retriever 223, an address adjuster 225, a backtrace generator 227, and a function call stack generator 230.

The program software that is being examined may comprise of several parts or program modules, such as software processes and libraries. A program module has a corresponding unwind table 271A and symbol table 273A. A program module may be a dynamic module that includes additional references to shared libraries, which each have an unwind table 271A and a symbol table 273A that the program module dynamically links to. Unwind tables 271A and symbol tables 273A can be stored in data stores 270 with information that identifies a program module or a shared library for the program module that corresponds to an unwind table 271A and a symbol table 273A.

Introspection tool user scripts can be written to run against a particular target program module, such as a software process or library. A user script 251 can include instructions to generate a backtrace for the target program module. A user can use an introspection tool user interface 203 to write or to select a user script. The user interface 203 can be a graphical user interface. The unwind data system 200 can be coupled to a data store 250 that stores user scripts 251. The data store 250 can be a persistent storage unit. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. A 'set', as used herein, refers to any positive whole number of items.

The unwind data system 200 can be coupled to one or more data stores 270, such as disks, network storage, and virtual memory, that store unwind data 275 in debug data files which are generated by a compiler that compiled the program that is being examined. In phase one 283, at 'start-up time', which can be when an introspection tool starts to process a user script 251 and prior to the introspection tool making an attempt to generate a backtrace, the data preloader 205 can identify a target program module from the user script 251 and can, at this 'start-up time', search the data stores 270 for an unwind table 271A and a symbol table 273A that corresponds to the target program module. In addition, the data preloader 205 can examine the target program module and may determine that the target program module is a dynamic module. The data preloader 205 can search the data stores 270 to locate the unwind tables 271A and symbol tables 273A that correspond to the shared libraries of the target program module. The data preloader 205 can load and store the unwind table 271B and the symbol table 273B that correspond to the target program module and each shared library in main memory for which an operating system guarantees that the contents of memory pages that reside in the main memory are not paged out to a 'swap' area, but are instantly accessible.

In one embodiment, the data preloader 205 can allocate new memory that is resident in the kernel memory space 280 for storing the unwind tables 271B, symbol tables 273B, and address data 253, module data 255, and dynamic load data 259 which allow the introspection tool to load the tables from the kernel memory space 280. In another embodiment, the data preloader 205 can lock memory pages in the main memory. The data preloader 205 can allocate main memory for storing the unwind data during phase one 283, prior to the introspection tool making an attempt to generating a backtrace.

The module data manager 210 can store module data 255 for the target program module (e.g., software process, library). Examples of module data 255 include the name of the target program module, the path of the target program module on the data store 270 as it would be loaded at runtime, the code load address of the target program module, the length of the data of the target program module, and the length of the target program software code section that is described by the corresponding unwind table and symbol table, etc. Subsequently, during phase two 285, when the system 200 attempts to generate a backtrace and function call stack, the unwind data retriever 223 can use the module data 255 to locate the descriptions of the code section, which correspond to the trigger, in the unwind table 271B and the symbol table 273B.

The module data manager 210 can store the module data 255 during phase one 283 in the kernel memory space 280.

The load tracker 215 can track the main memory location, such as in the designated kernel memory space, for an unwind table 271B and a symbol table 273. A target program module may be a dynamic module, such as a shared library, that may be running in different processes at different memory addresses. Thus, an unwind table 271B and a symbol table 273B that correspond to the shared library can be used at multiple different memory address layouts. The load tracker 215 can store dynamic load data 259, such as a new (actual) load address for the target program module and for the shared libraries of the target program module, in the memory pages in the main memory (e.g., pages in the designated kernel memory space 280). Dynamic load data 259 can include a virtual memory map associated with the target program module that tracks where the unwind tables 271B and the symbol tables 273B are loaded and stored to distinguish between the same tables being used in multiple locations. Subsequently, during phase two 285, the address adjuster 225 can use the new load address as tracked by the virtual memory map that is associated with a target program module to allow the introspection tool access to the appropriate table for the target program module. The load tracker 215 can store the dynamic load data 259 during phase one 283 in the main memory pages.

The address data manager 220 can store address data 253 for the tables 271B,273B in the main memory pages. Address data 253 can include the original load address, which was intended by a compiler program, for an unwind table 271B, and the new (actual) load addresses for the tables 271B,273B. The address data manager 220 can ensure that the addresses in a symbol table 273B are addresses that are relative to a base address of zero. Subsequently, during phase two 285, when system 200 attempts to use the unwind tables 271B and the symbol tables 273B that are preloaded in the main memory pages, the address adjuster 225 can use the address data 253 to make adjustments to offsets (relative addresses) in the tables to reflect the actual addresses for the tables. The address data manager 220 can make the offsets in the tables 271B,273B relative to the new load addresses of the tables 271B,273B. The address data manager 220 can store the address data 253 during phase one 283.

At phase two 285, after the system 200 has already preloaded the unwind data, such as unwind tables 271B, symbol tables 273B, address data 253, module data 255, and dynamic load data 259, for the target program module in the pages in the main memory, the introspection tool continues to process the user script 251 and attempts to generate a backtrace for the target program module.

The unwind data retriever 223 can detect a trigger in the user script 251 that causes the unwind data system 200 to access the unwind data that was preloaded in the main memory pages (e.g., pages in the kernel memory space 280) for the target program module. A trigger interrupts a process from its normal operation, such as functions that probe a probe point in a program, functions that make a system call, process suspension due to a hardware interrupt, etc. A user script can include one or more functions that which interrupt a process, such as a probe function. The trigger identifies a section of the program software code of the target program module that is being examined. For example, the trigger may be a probe function in the user script 251.

When the unwind data retriever 223 detects a trigger, the unwind data retriever 223 receives a register set and can use the register set to locate the unwind table 271B and symbol table 273B, which corresponds to the trigger, in the main memory pages. The register set is provided by the operating system kernel, and is a snapshot of the processor's registers at the moment the trigger is detected. The register set can be stored in the main memory pages as register data 263.

The unwind data retriever 223 can use the module data 255 that was preloaded in the main memory pages to locate descriptions of the program code section, which correspond to the trigger, in the tables 271B,273B. One embodiment of a method for locating code descriptions, which correspond to the trigger, in an unwind table and a symbol table is described in greater detail below in conjunction with FIG. 4.

During phase two 285, after the unwind data retriever 223 locates the code sections in the tables 271B,273B, an address adjuster 225 can use the address data 253 for an unwind table 271B to 'relocate' the relative addresses in an unwind table 271B to allow the system 200 access to the tables from the main memory pages (e.g., pages in the kernel memory space 280). The address adjuster 225 can also relocate the relative addresses in a symbol table 273B The address adjuster 225 can determine whether the target program module is a dynamic module. If the target program module is a dynamic module, the address adjuster 225 can add the load address of the target program module as found by the virtual memory map to a relative address in a table. The actual load address of a shared library is added to the offsets (relative addresses) that are stored in an unwind table 271B and a symbol table 273B. The resulting sums are compared to the stored register values 263 to find matches.

The backtrace generator 227 can use the 'relocated' addresses to load the unwind tables 271B from the memory pages in the main memory to unwind the program software and generate a backtrace 257 for the target program module. The backtrace 257 can be stored in a data store 250. The function call stack generator 230 can load the symbol tables 273B from the main memory pages to translate a backtrace 257 into a function call stack 261. The function call stack generator 230 uses the symbol tables 273B to map each PC address in the backtrace 257 to a programmer-friendly function name. The function call stack 261 can be stored in a data store 250.

Figure 3:
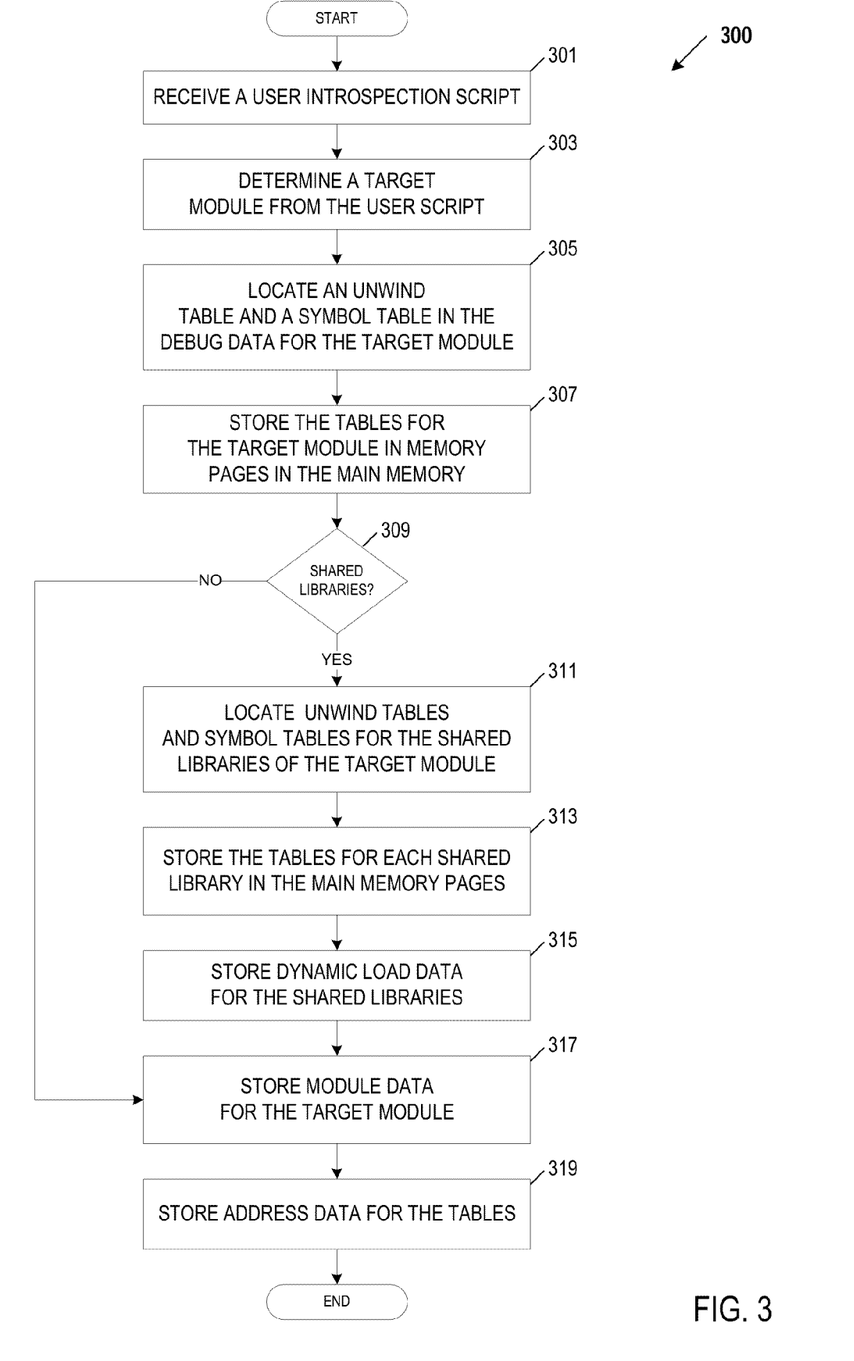
FIG. 3 is a flow diagram of one embodiment of a method for preloading unwind data in memory pages in main memory prior to an introspection tool making an attempt to generate a backtrace.

FIG. 3 is a flow diagram of one embodiment of a method 300 for preloading unwind data in memory pages in main memory prior to an introspection tool making an attempt to generate a backtrace. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the unwind data system 140 in the computing and introspection system 100 of FIG. 1.

In one embodiment, the method 300 starts with a computing and introspection system executing an introspection tool that includes an unwind data system for non-intrusive backtracing of software. In one embodiment, prior to running an introspection user script, the unwind data system allocates new memory that is resident in the main memory, such as memory pages in a designated kernel memory space, to store unwind data. At block 301, the unwind data system receives a user script and begins to process the user script. A user script may be an existing script selected by the user from the scripts stored in a script store, or any script submitted by the user.

At block 303, at the 'start-up' time for processing the user script, the unwind data system determines a target program module from the user script. User scripts can be written to run against a particular target program module, such as a software process or a library, and can include instructions to generate a backtrace for the target program module.

At block 305, the unwind data system searches debug data, which is generated by a compiler that compiled the program that is being examined and is stored in one or more data stores, for example, disks, to locate an unwind table and a symbol table that correspond to the target program module. Unwind tables and symbol tables can be stored in data stores with information that identifies a program software module or a shared library for the program software module that corresponds to an unwind table and a symbol table.

At block 307, the unwind data system loads and stores the unwind table and the symbol table for the target program module in the memory pages in the main memory (e.g., memory pages in the designated kernel memory space). In one embodiment, the unwind data system loads and stores all of the unwind data which may be needed to generate a backtrace in the main memory pages at the 'start-up time' for processing the user script. In another embodiment, the unwind data system loads and stores a portion of the unwind data that may be needed to generate a backtrace at the 'start-up time', and subsequently loads and stores the remaining portion dynamically ('on-the-fly') in response to detecting instructions to generate a backtrace, but still prior to an actual backtrace attempt.

At block 309, the unwind data system examines the target program module to determine whether it has any shared libraries which it needs to dynamically link to. A program module may be in an ELF format, which includes an ELF header. The program module ELF header has various sections, including a '.dynamic' section which has an element, 'DT_NEEDED', that holds the names of the required shared libraries for the program module to dynamically link to. The unwind data system can examine the '.dynamic' section of the target program module to determine whether there are any shared libraries for the target program module.

If there are shared libraries that are listed in the '.dynamic' section (block 309), the unwind data system identifies the libraries from the 'DT_NEEDED' element and looks up each library through the library search path to locate the unwind table and symbol table for each shared library at block 311. At block 313, the unwind data system loads and stores the unwind table and the symbol table for the shared libraries for the target program module in the main memory pages. If there are not any shared libraries listed in the '.dynamic' section (block 309), the method continues to block 317.

At block 315, the unwind data system stores dynamic load data for the target program module and for the shared libraries for the target program module. Dynamic load data can include a virtual memory map associated with the target program module that includes the new load address of the target program module. A target program module may be a shared library or may reference a shared library. Shared libraries may be running in different processes at different memory addresses. Thus, the same unwind data for the shared library may be used at multiple different memory address layouts. The unwind data system tracks where the unwind tables and the symbol tables are loaded and stored to distinguish between the same tables being used in multiple locations. The unwind data system can place 'hooks' in the kernel and/or a dynamic loader to track a virtual memory map that is associated with the target program module. The virtual memory map describes an address range of each process to which a preloaded unwind table and a symbol table may belong. The unwind data system can implement the hooks, for example, via a 'utrace' callback.

At block 317, the unwind data system stores module data for the target program module. Examples of module data include the name of the target program module, the path of the target program module on a data store, such as disk, as it would be loaded at runtime, the code load address of the target program module, and the length of the data of the target program module and the length of the code sections of the target program module that are described by the unwind table and the symbol table. Subsequently, the introspection tool can use the module data to locate data that describes a code section of the target program module in the unwind table to generate a backtrace and data in the symbol table to generate a function call stack. One embodiment of a method for using the module data to generate a backtrace and a function call stack is described in greater detail below in conjunction with FIG. 4. In one embodiment, the unwind data system can verify matches between the stored unwind tables and symbol tables with the actual run-time loaded libraries. For example, the unwind data system can use executable and linkable file format (ELF) 'build-id' strings (hash-based identity codes) to verify the matches.

At block 319, the unwind data system stores address data for the unwind table and the symbol table for the target program module, including the unwind tables and symbol tables for any shared libraries for the target program module. The unwind data system can record the original load address, which was intended by a compiler program, for an unwind table, and ensure that the addresses in a symbol table are relative addresses to a base address of zero. The relative address may be an offset that denotes a number of address locations that are added to a base address in order to get to an absolute address. The unwind data system can store the address data at the user script 'start-up time'. Subsequently, when the introspection tool attempts to use the unwind tables and the symbol tables, the unwind data system can use the address data to make adjustments to the starting load addresses of the unwind tables to reflect the actual addresses for the tables. The system can also make adjustments to the relative addresses that are in the symbol tables to reflect the actual addresses for the tables. One embodiment of a method for adjusting the address data to generate a backtrace and a function call stack is described in greater detail below in conjunction with FIG. 4.

Subsequently, when the introspection tool attempts to generate a backtrace and function call stack for a section of code for the target program module, the unwind table and symbol table for the target program module and the tables for any shared libraries for the target program module are readily available in the memory pages in the main memory (e.g., pages in the kernel memory space), which can dramatically cut down the overhead for a backtrace and a function call stack generating operation.

Figure 4:
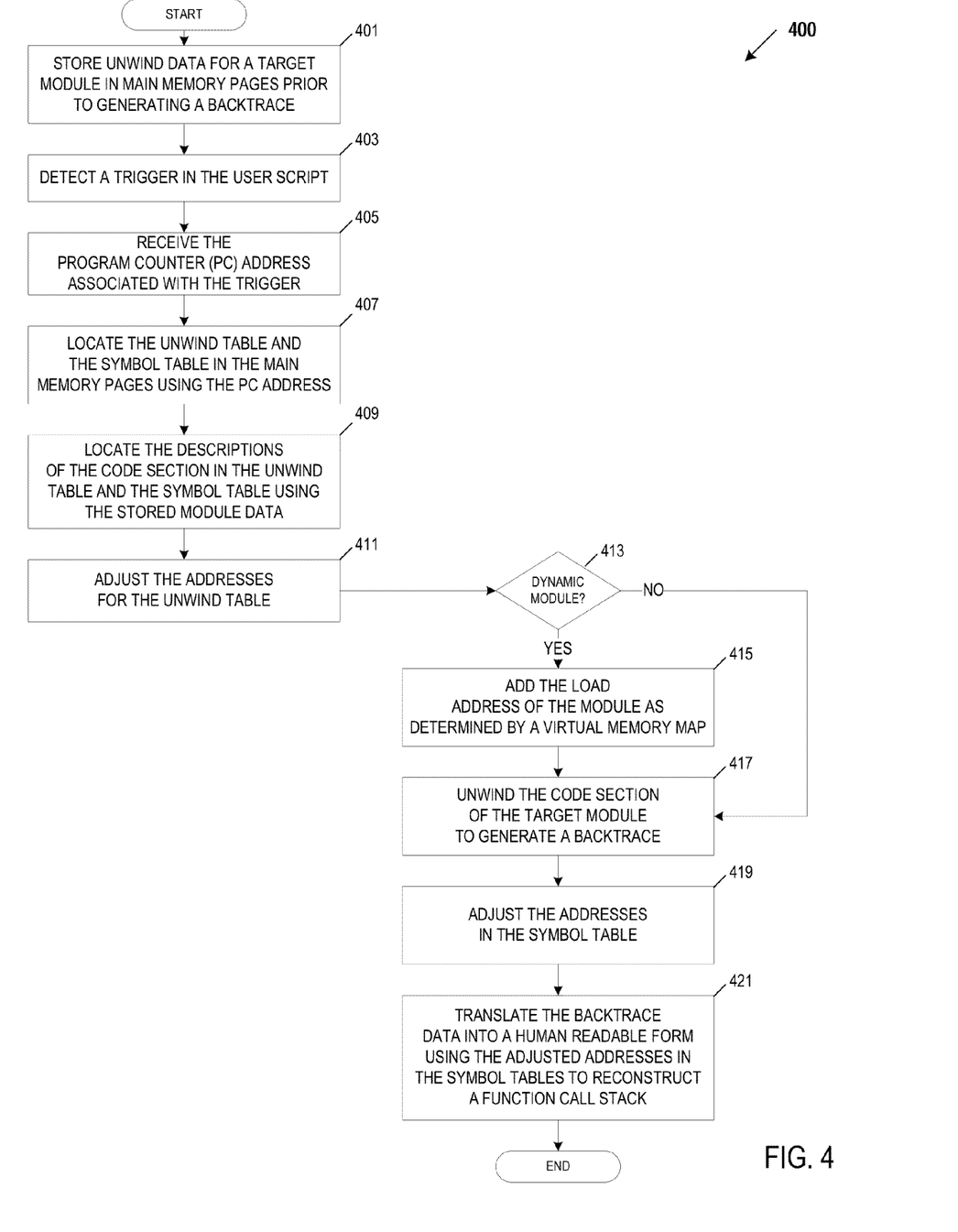
FIG. 4 is a flow diagram of one embodiment of a method for generating a backtrace and function call stack using preloaded unwind data in memory pages in main memory.

FIG. 4 is a flow diagram of one embodiment of a method 400 for generating a backtrace and a function call stack using unwind data that is preloaded in main memory pages, such as memory pages in a designated kernel memory space. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the unwind data system 140 in the computing and introspection system 100 of FIG. 1.

In one embodiment, the method 400 starts with a computing and introspection system executing an introspection tool to generate a backtrace for a target program which may be stopped or interrupted. The introspection tool is processing a user script that is written to run against a particular target program module, such as a software process or a library, and can include instructions to generate a backtrace for the target program module. Software developers can include markers in the program software code of the target program module that correspond to a section of the program software code. The user script includes probe functions to probe events that are marked in the software code of the target program module.

At block 401, the unwind data system stores unwind data for a target program module in memory pages in the main memory, such as memory pages in a designated kernel memory space, prior to the introspection tool making an attempt to generate a backtrace for the target program module. The unwind data can include an unwind table for the target program module, a symbol table for the target program module, an unwind table and a symbol table that correspond to a shared library of the target program module, address data for an unwind table, address data for a symbol table, dynamic load data for the target program module and for a shared library of the target program module, and module data for the target program module. The dynamic load data includes a virtual memory map associated with the target program module, and the module data includes a name of the target program module, a path of the target program module, and a length of data of the target program module and a length of a code section of the target program module.

At block 403, the unwind data system detects a trigger in the user script. A trigger interrupts a process from its normal operation, such as functions that probe a probe point in a program, functions that make a system call, process suspension due to a hardware interrupt, etc. A user script can include one or more functions that interrupt a process, such as a probe function. A trigger in a user script corresponds to a section of program software code of the target program module. When the unwind data system detects a trigger in the user script, it receives a register set, which includes the program counter (PC) address, and a task identifier at block 405. The task (process) identifier and the register set describe the state of the machine at the moment the trigger occurred. The PC address is a processor register that can hold the address of the instruction that was being executed. The unwind data system can receive the register set and task identifier from the operating system kernel.

At block 407, the unwind data system uses the PC address to locate the appropriate unwind table and the symbol table in the main memory pages, such as pages in the kernel memory space, for the target program module. At block 409, the unwind data system uses the module data for the target program module that is stored in the kernel memory space to locate the part of the unwind table and the part of the symbol table that describes the section of code of the target program module that corresponds to the probe trigger. Unwind tables and symbol tables include descriptions of sections of code of the target program module. A symbol table includes code descriptions that can be used to find base information to display a backtrace for the target module in human readable form. An unwind table includes code descriptions that describe algorithms for retrieving call frame information given a starting memory address and a register set, where each call frame corresponds to a call to a subroutine in the software of the target program module. The module data includes the code load address of the program module and the length of a code section that is described by an unwind table and a symbol table. The unwind data system uses the code load address of the program module and the length of the code sections to find the descriptions of the code section that corresponds to the probe trigger in the unwind table and the symbol table.

In order to use the descriptions in the unwind table, the unwind data system makes adjustments to the offsets (relative addresses) in the unwind tables at block 411. The unwind data system uses the address data (e.g, the original load address)

for the unwind table that is stored in the kernel memory space to 'relocate' to the relative addresses in the unwind table to reflect the actual load address for the table that is in use. Typically, a compiler program optimizes an unwind table and symbol table for being loaded together with the software. The preloading of the unwind table into memory pages in the main memory independent of the software, however, changes the load addresses and the relative memory locations for the tables since the addresses in an unwind table are no longer relative to the original load address of the unwind table. The unwind data system adjusts the addresses in the unwind table to become relative to the new load address of the unwind table. The unwind data system 'relocates' the relative addresses in the unwind table by subtracting the stored original load address from a relative address and adding the new load address. A new load address of the unwind table reflects the current load address for the unwind table in the main memory pages. The result of this calculation is an address in the unwind table that is relative to the new load address of the unwind table.

At block 413, the unwind data system examines the target program module to determine whether the target program module is a dynamic module. A dynamic module contains references to shared libraries. A shared library may be running in different processes at different memory addresses and thus, the unwind table and symbol table that correspond to the shared library can be used at multiple different memory address layouts. The unwind data system can examine the '.dynamic' section of the target program module to determine whether there are any shared libraries which the target program module needs to link to. If there are no shared libraries that are listed in the '.dynamic' section (block 413), the method continues to block 419. If there are shared libraries that are listed in the '.dynamic' section (block 413), the unwind data system determines the new (actual) load address of the target program module from a virtual memory map that is associated with the target program module, which the unwind data system is tracking, and adds the actual load address of the target program module to the offsets (relative addresses) that are stored in an unwind table and a symbol table at block 415.

At block 417, the unwind data system unwinds the code section of the target program module to generate a backtrace using the relocated addresses in the unwind table. A backtrace is a textual report that lists the program counter (PC) address for each call frame that was executed in the software code to arrive at the starting call frame.

At block 419, the unwind data system adjusts the relative addresses in the symbol table for the target program module to reflect the actual addresses that are in use. The offsets (relative addresses) in a symbol table are relative to a base address of zero. The unwind data system can adjust the offsets to make them relative to the new load address of the symbol table. The system adds the new load address to an offset. The unwind data system can use the result of this calculation to access the symbol data. A new load address of the symbol table reflects the current load address for the symbol table in the main memory pages.

At block 421, the unwind data system translates the backtrace data into a human readable form using the adjusted addresses in the symbol table to reconstruct the function call stack for the interrupted or stopped program software. A symbol table maps relative addresses or absolute addresses to function symbol names. The unwind data system uses the symbol table to map each PC address in the backtrace to a human readable function name. The unwind data system can perform the translation immediately following the generation of the backtrace or can be deferred to a later reporting pass, at the preference of a user script author, etc. The output of the translation is a function call stack, which is a human readable representation of each call frame that provides the registers, including the PC address and stack pointer (SP).

Figure 5:
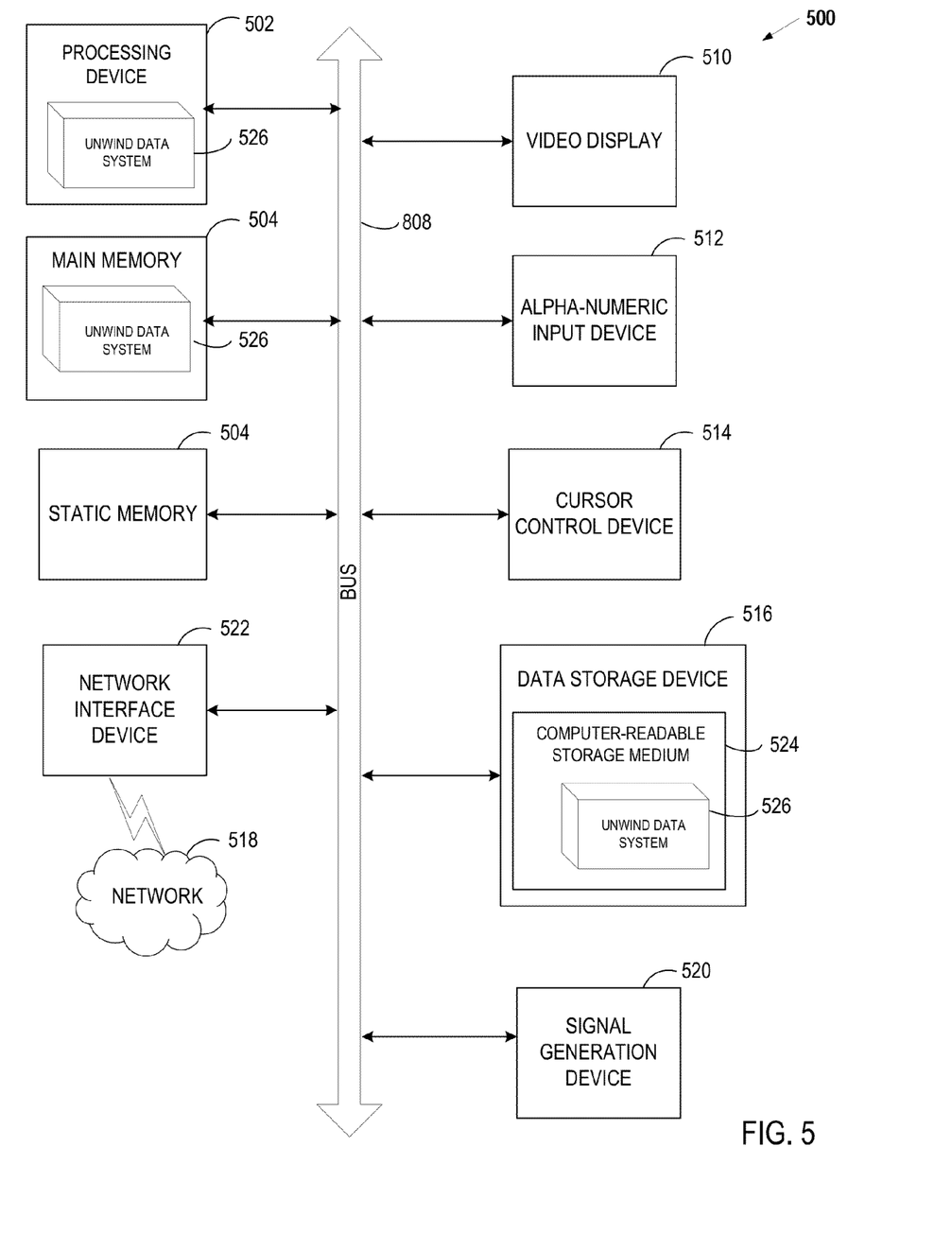
FIG. 5 is a diagram of one embodiment of a computer system for an unwind data system.

FIG. 5 is a diagram of one embodiment of a computer system for preloading unwind data and using the preloaded unwind data for generating a backtrace. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, registers 528, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 can contain several kinds of registers, such as address registers 528. Address registers 528 can hold addresses that may be instructions that indirectly access memory. Processing device 502 is configured to execute the unwind data system 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., the unwind data system 526) embodying any one or more of the methodologies or functions described herein. The unwind data system 526 may also reside, completely or at least partially, within the main memory 504 and/or within the processing device 502 during execution thereof by the computer system 500, the main memory 504 and the processing device 502 also constituting machine-readable storage media. The unwind data system 526 may further be transmitted or received over a network 518 via the network interface device 522.

The computer-readable storage medium 524 may also be used to store the unwind data system 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The unwind data system 526, components and other features described herein (for example in relation to FIG. 1) can be implemented as discrete hardware components or integrated in the functionality of hardware components such as ASICS, FPGAs, DSPs or similar devices. In addition, the unwind data system 526 can be implemented as firmware or functional circuitry within hardware devices. Further, the unwind data system 526 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "storing", "detecting", "locating", "unwinding", "translating", "adjusting", "determining", "adding", "receiving", "identifying", "loading", "generating", "designating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for preloading unwind data for generating a backtrace has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   prior to detecting a trigger in a user script to generate a backtrace for a target module,
      retrieving unwind data for the target module from a data store, wherein the unwind data includes an unwind table, a symbol table, and module data; and
      storing the unwind data for the target module in memory pages that exist in a designated kernel memory space of the main memory;
   detecting, by a processing device, the trigger in the user script to generate the backtrace for the target module, wherein detecting comprises receiving a program counter address;
   locating, within the memory pages of the designated kernel memory space, the unwind table and the symbol table corresponding to the program counter address;

locating, from the module data, a part of the unwind table and a part of the symbol table that describes a code section of the target module corresponding to a backtrace probe;

adjusting relative addresses in the unwind table and in the symbol table to relocate the relative addresses to reflect actual load addresses in use;

in response to detecting the trigger, generating the backtrace using the unwind data for the target module in the unwind table and the symbol table, wherein generating comprises unwinding the code section of the target module by using the relocated relative addresses in the unwind table;

using the relocated relative addresses in the symbol table to translate the backtrace into a human readable format; and outputting a function call stack based on the translated backtrace.

2. The method of claim 1, wherein the data store is selected from one or more of a disk, network storage, or virtual memory.

3. The method of claim 1, wherein the main memory is directly accessible by the processing device, and wherein an operating system guarantees that contents of the memory pages are not paged out to a swap area.

4. The method of claim 1, wherein the unwind table and the symbol table correspond to a shared library of the target module.

5. The method of claim 1, wherein the unwind data further comprises address data for the unwind table, address data for the symbol table, dynamic load data for the target module and for a shared library of the target module, the dynamic load data comprising a virtual memory map associated with the target module, wherein the module data comprises a name of the target module, a path of the target module, a length of data of the target module, and a length of the code section of the target module.

6. The method of claim 5, further comprising:
determining that the target module is a dynamic module;
determining a load address of the target module from the virtual memory map that is associated with the target module; and
adding the load address of the target module to the relative addresses in the unwind table.

7. A system comprising:
a memory comprising main memory; and
a processing device operatively coupled to the memory, the processing device to, prior to detecting a trigger in a user script to generate a backtrace for a target module:
retrieve unwind data for the target module from a data store, wherein the unwind data includes an unwind table, a symbol table, and module data, and
store the unwind data for the target module in memory pages that exist in a designated kernel memory space of the main memory;
the processing device further to:
detect the trigger in the user script to generate the backtrace for the target module, comprising to receive a program counter address;
locate, within the memory pages of the designated kernel memory space, the unwind table and the symbol table corresponding to the program counter address;
locate, from the module data, a part of the unwind table and a part of the symbol table that describes a code section of the target module corresponding to a backtrace probe;
adjust relative addresses in the unwind table and in the symbol table to relocate the relative addresses to reflect actual load addresses in use;
in response to detecting the trigger, generate the backtrace using the unwind data for the target module in the unwind table and the symbol table, wherein to generate the backtrace comprises to unwind the code section of the target module by using the relocated relative addresses in the unwind table;
use the relocated relative addresses in the symbol table to translate the backtrace into a human readable format; and
output a function call stack based on the translated backtrace.

8. The system of claim 7, wherein the unwind table and the symbol table correspond to a shared library of the target module.

9. The system of claim 7, wherein the data store is selected from one or more of a disk, network storage, or virtual memory.

10. The system of claim 7, wherein the main memory is directly accessible by the processing device, and wherein an operating system guarantees that contents of the memory pages are not paged out to a swap area.

11. A non-transitory computer-readable medium having instructions encoded thereon that, when executed by a processing device, cause the processing device to:
prior to detecting a trigger in a user script to generate a backtrace for a target module,
retrieve unwind data for the target module from a data store, wherein the unwind data includes an unwind table, a symbol table, and module data; and
store the unwind data for the target module in memory pages that exist in a designated kernel memory space of the main memory;
detect, by the processing device, the trigger in the user script to generate the backtrace for the target module, comprising to receive a program counter address;
locate, within the memory pages of the designated kernel memory space, the unwind table and the symbol table corresponding to the program counter address;
locate, from the module data, a part of the unwind table and a part of the symbol table that describes a code section of the target module corresponding to a backtrace probe;
adjust relative addresses in the unwind table and in the symbol table to relocate the relative addresses to reflect actual load addresses in use;
in response to detecting the trigger, generate the backtrace using the unwind data for the target module in the unwind table and the symbol table, wherein to generate the backtrace comprises to unwind the code section of the target module by using the relocated relative addresses in the unwind table;
use the relocated relative addresses in the symbol table to translate the backtrace into a human readable format; and
output a function call stack based on the translated backtrace.

12. The non-transitory computer-readable medium of claim 11, wherein the data store is selected from one or more of a disk, network storage, or virtual memory.

13. The non-transitory computer-readable medium of claim 11, wherein the main memory is directly accessible by the processing device, and wherein an operating system guarantees that contents of the memory pages are not paged out to a swap area.

14. The non-transitory computer-readable medium of claim 11, wherein the unwind table and the symbol table correspond to a shared library of the target module.

15. The non-transitory computer-readable medium of claim 11, wherein the unwind data further comprises address data for the unwind table, address data for the symbol table, dynamic load data for the target module and for a shared library of the target module, the dynamic load data comprising a virtual memory map associated with the target module, wherein the module data comprises a name of the target module, a path of the target module, a length of data of the target module, and a length of the code section of the target module.

16. The non-transitory computer-readable medium of claim 15, wherein the instructions further to cause the processing device to:
    determine that the target module is a dynamic module;
    determine a load address of the target module from the virtual memory map that is associated with the target module; and
    add the load address of the target module to the relative addresses in the unwind table.

17. The system of claim 7, wherein the unwind data further comprises address data for the unwind table, address data for the symbol table, dynamic load data for the target module and for a shared library of the target module, the dynamic load data comprising a virtual memory map associated with the target module, wherein the module data comprises a name of the target module, a path of the target module, a length of data of the target module, and a length of the code section of the target module.

18. The system of claim 17, wherein the processing device further to:
    determine that the target module is a dynamic module;
    determine a load address of the target module from the virtual memory map that is associated with the target module; and
    add the load address of the target module to the relative addresses in the unwind table.

* * * * *